3,494,738
PREPARATION OF IRON CARBIDE (Fe₃C)
Peter R. Gray and Billy J. Le Roy, Bartlesville, Okla., assignors to Phillips Petroleum Company, a corporation of Delaware
No Drawing. Filed Mar. 14, 1968, Ser. No. 712,949
Int. Cl. C01b *31/30;* C22c *29/00*
U.S. Cl. 23—208                                                     8 Claims

ABSTRACT OF THE DISCLOSURE

A method of preparing iron carbide which comprises decomposing ferrocene at high temperatures and reduced pressures and cooling the product to ambient temperature under reduced pressures at which point the product is stable.

---

This invention relates to the production of iron carbide. In one of its more specific aspects, this invention relates to the production of iron carbide by pyrolytic decomposition of ferrocene.

Iron carbide, which is also known as cementite, is an interstitial compound of iron having a molecular formula of $Fe_3C$, a Curie point of 205° C. to 220° C., and a specific magnetization at magnetic saturation and at room temperature of 135 to 139 c.g.s. units per gram. Cementite may also be identified by its crystal structure which comprises an orthorhombic cell unit with latticed parameters $a=4.517$ $kX$ units, $b=5.079$ $kX$ units, $c=6.730$ $kX$ units. Cementite is also characterized by its X-ray diffraction data.

Ferrocene, also known as dicyclopentadienyl iron or bis-cyclopentadienyl iron, has the formula $(C_5H_5)_2Fe$. It is an orange solid having a melting point of approximately 173.5° C. and can be sublimed above 100° C. It is soluble in chloroform, benzene, petroleum ether and other typical organic solvents, but insoluble in water. It is stable in air at ordinary temperatures but oxidized by air at higher temperatures.

Numerous methods of preparing cementite or iron carbide have been attempted because of the use of the material as a low temperature synthesis gas catalyst. Generally the prior methods have involved high temperatures with the production of iron carbide which tended to decompose when cooled below 1140° C. At this point cementite tends to solidify to ledeburite, a eutectic mixture of cementite and austenite. Upon further cooling the mixture, additional graphite separates from the mixture. As the result, most prior processes have resulted in cementite, if produced at all, being contaminated with free or elemental carbon.

The method of this invention comprises the preparation of iron carbide by pyrolytically decomposing ferrocene at superatmospheric temperatures and subatmospheric pressures and cooling the product to a temperature about ambient at subatmospheric pressures.

Accordingly, it is the object of this invention to provide a method of producing iron carbide.

It is a further object of this invention to produce iron carbide suitable for use as low temperature synthetic catalyst.

The present invention may be carried out either as a batch or as a continuous process. Since it is necessary that the ferrocene be held at an elevated temperature, the invention is easily adaptable to a batch process. If adapted to a continuous process, it is easily performed in a kiln type reactor in which the ferrocene residence time within the heating zone is suitably prolonged.

Pyrolytic decomposition of the ferrocene for the production of iron carbide takes place above a temperature of 475° C. The ferrocene should be maintained within a temperature range of about 475° C. to about 600° C., preferably about 510° to about 550° C.

The decomposition of the ferrocene is performed at reduced pressures. Pressures less than about 50 microns mercury are employed, pressures preferably being maintained from about 5 to about 50 microns of mercury. While decomposition can be effected in an inert atmosphere, lower pressures are preferable inasmuch as inert atmospheres tend to promote the decomposition of the iron carbide to iron, whereas the low pressures tend to produce a pure product.

Temperatures and pressures previously defined are maintained for a period of from about 1 hour to about 16 hours, preferably from about 1 hour to about 5 hours. During this period, gases such as methane and hydrogen may be evolved. For this reason, it is preferred that the reaction be conducted in a closed system. However, it is not desirable to vent the system of such gases since venting promotes sublimation of the ferrocene.

On the completion of the decomposition of the ferrocene, the reaction mixture should be cooled to about ambient temperature, that is, to a temperature of about 15° C. to about 35° C. under the reduced pressure previously defined. Care should be taken to cool the mixture to a temperature less than about 50° C. since above this temperature the hydrogen from the pyrolysis of the ferrocene acts to make the iron carbide pyrophoric, thereby changing the iron carbide into the oxides of iron. Cooling to about ambient temperature can be done at any convenient rate.

The process of this invention will be more easily understood by reference to the following example.

EXAMPLE

Two parts by weight of ferrocene were placed in a reactor and the reactor was evacuated to 5 mm. mercury. The reactor and ferrocene were heated to a temperature between 540° and 550° C. and maintained at this temperature for 1 hour. Thereafter, the bomb and its contents were cooled to 22° C., at which temperature the iron carbide product was stable.

The method of this invention has been described in its most general aspect. It will be appreciated that deviations can be made from the method outlined herein without departing from the scope of the invention.

What is claimed is:

1. A process for producing iron carbide which comprises maintaining ferrocene at a temperature about 475° C. to about 600° C. and at a pressure of less than about 50 microns of mercury for a period of not less than about 1 hour, and cooling the reaction mixture to about ambient temperature under said pressure.

2. The process as defined in claim 1 in which the temperature is maintained between about 510° C. and about 550° C.

3. The process defined in claim 1 in which the pressure is maintained between about 5 and about 50 microns of mercury.

4. The process defined in claim 1 in which the temperature and pressure are maintained for a period between about 1 and about 5 hours.

5. The process defined in claim 1 in which the temperature is maintained between about 510° C. and about 550° C. and the pressure is maintained between about 5 and about 50 microns of mercury.

6. The process defined in claim 1 in which the temperature is maintained between about 510° C. and about 550° C. and the pressure is maintained between about 5 and about 50 microns of mercury for a period of between about 1 and about 5 hours.

7. The process defined in claim 1 in which the process is conducted continuously.

8. The process as defined in claim 1 in which the process is conducted as a batch process.

References Cited

UNITED STATES PATENTS 2,535,042  12/1950  Cohn et al.

FOREIGN PATENTS 687,383  5/1964  Canada.

OTHER REFERENCES

Merck Index, 7th ed., 1960, p. 448. RS 356M524.

OSCAR R. VERTIZ, Primary Examiner

G. T. OZAKI, Assistant Examiner

U.S. Cl. X.R.

252—443